(12) United States Patent
Shu et al.

(10) Patent No.: US 11,192,201 B2
(45) Date of Patent: Dec. 7, 2021

(54) DOUBLE-POWER-SUPPLY SWITCHING CONTROL SYSTEM FOR A WELDING MACHINE AND METHOD

(71) Applicant: SHANGHAI HUGONG ELECTRIC (GROUP) CO., LTD., Shanghai (CN)

(72) Inventors: Zhenyu Shu, Shanghai (CN); Lin Nie, Shanghai (CN); Yaomin Zhu, Shanghai (CN)

(73) Assignee: SHANGHAI HUGONG ELECTRIC (GROUP) CO., LTD., Shanghai (CN)

( * ) Notice: Subject to any disclaimer, the term of this patent is extended or adjusted under 35 U.S.C. 154(b) by 484 days.

(21) Appl. No.: 16/221,565

(22) Filed: Dec. 16, 2018

(65) Prior Publication Data

US 2020/0067414 A1 Feb. 27, 2020

(30) Foreign Application Priority Data

Aug. 24, 2018 (CN) .......................... 201810974179.9

(51) Int. Cl.
| | |
|---|---|
| *H02M 1/10* | (2006.01) |
| *H02J 9/06* | (2006.01) |
| *H02M 7/40* | (2006.01) |
| *H02M 3/335* | (2006.01) |
| *B23K 9/10* | (2006.01) |

(52) U.S. Cl.
CPC .......... *B23K 9/1043* (2013.01); *B23K 9/1075* (2013.01); *H02J 9/06* (2013.01); *H02M 1/10* (2013.01); *H02M 7/40* (2013.01); *B23K 9/1012* (2013.01); *H02M 3/33507* (2013.01); *H02M 3/33523* (2013.01)

(58) Field of Classification Search
CPC ....... B23K 9/1043; B23K 9/1075; H02J 9/06; H02M 1/10; H02M 7/40; H02M 3/33507; H02M 3/33523
USPC .............................. 219/130.21; 307/126, 130
See application file for complete search history.

(56) References Cited

U.S. PATENT DOCUMENTS

| | | | |
|---|---|---|---|
| 6,570,129 B1 | 5/2003 | Samodell | |
| 8,094,471 B1* | 1/2012 | Smith | ...................... H02M 1/10 363/61 |
| 2002/0063116 A1* | 5/2002 | Ikeda | ................... B23K 9/1056 219/130.21 |

FOREIGN PATENT DOCUMENTS

| | | |
|---|---|---|
| CN | 201839071 U | 5/2011 |
| CN | 101733516 B | 1/2012 |
| CN | 202162481 U | 3/2012 |
| CN | 202817892 U | 3/2013 |
| CN | 103780105 A | 5/2014 |
| CN | 102801205 B | 5/2015 |
| CN | 204425202 U | 6/2015 |
| CN | 105478966 A | 4/2016 |
| CN | 104601018 B | 3/2017 |

(Continued)

*Primary Examiner* — Michael R. Fin

(57) ABSTRACT

The invention provides a double-power-supply switching control system for a welding machine and method. The welding machine double-power-supply switching control method comprises the steps of: continuously detecting and modifying an input voltage signal by a signal modification unit; under the control of a control unit, judging, by a judgment unit, whether to perform voltage doubling, controlling to execute voltage doubling switching action, and locking an actual input voltage mode of a welding machine by a locking unit; and finally outputting matched output current by a power supply output unit.

17 Claims, 5 Drawing Sheets

(56) References Cited

FOREIGN PATENT DOCUMENTS

| | | |
|---|---|---|
| CN | 106141376 B | 11/2017 |
| CN | 206811287 U | 12/2017 |
| CN | 206854819 U | 1/2018 |

\* cited by examiner

001
DOUBLE-POWER-SUPPLY SWITCHING CONTROL SYSTEM FOR A WELDING MACHINE AND METHOD

CROSS-REFERENCE TO RELATED APPLICATION

This application claims priority of Chinese patent application No. 201810974179.9, filed on Aug. 24, 2018, the entire contents of which are hereby incorporated by reference in their entirety.

TECHNICAL FIELD

This application relates to the technical field of welding machines, and in particular to a double-power-supply switching control system for a welding machine and method.

BACKGROUND ART

Due to the demand of actual production operation, a double-voltage welding machine has become popular with more and more users; and a double-power-supply welding machine is relatively wide in voltage application range.

Generally, an inverter DC (Direct Current) electric welding machine provided with a double-power-supply voltage system includes a power supply voltage recognition circuit, an auxiliary power supply circuit, an inverter main loop and a current setting circuit which are in circuit connection, and a control circuit. The power supply voltage recognition circuit includes a voltage sampling circuit, a voltage recognition circuit and a relay circuit which are in circuit connection; the auxiliary power supply circuit includes a rectification circuit, a voltage doubling circuit and a power supply circuit which are in circuit connection; the voltage sampling circuit samples an input voltage signal and inputs the input voltage signal to the voltage recognition circuit, the voltage recognition circuit recognizes whether the input voltage signal is high voltage or low voltage, if the input voltage signal is high voltage, a relay doesn't operate, and if the input voltage signal is low voltage, the relay is attracted to be closed, the voltage doubling circuit operates, and rectification voltage is increased to rectification voltage of a high voltage power supply system.

However, failures will be caused if an input power supply of the electric welding machine above is input incorrectly; at the beginning of access, connection between a plug and a socket is not stable, electric potential of the plug will fluctuate greatly, while an existing recognition circuit can't recognize such fluctuations, so that once the plug is plugged into the socket completely, the voltage recognition circuit will have a wrong judgment result, and then a primary winding of a transformer input to single-phase high voltage will be incorrectly recognized as being input to single-phase low voltage, leading to magnetic core saturation and thus burning of the transformer and related power circuits; or, the primary winding of the transformer supposed to be input to the single-phase high voltage is incorrectly input to the single-phase low voltage, leading to that output voltage is insufficient, welding arc can't be maintained, and thus arc breaking and arc quenching appear.

Furthermore, the problem that the used power during operation of the electric welding machine is not matched with a power supply in which a circuit is practically plugged generally will lead to that welding power and power of the power supply are not matched and thus welding can't be performed normally.

SUMMARY OF THE INVENTION

To solve the problems above, the application is intended to provide a double-power-supply switching control system for a welding machine, characterized by comprising:
an input voltage unit for inputting an input voltage signal to a welding machine;
a signal modification unit, for performing a continuous detection and modification of the input voltage signal, and outputting a modified input voltage signal;
a power supply output unit for outputting an output voltage and an output current;
a control unit provided with a judgment unit for receiving said modified input voltage signal and judging whether to perform a voltage doubling and obtaining a judgment result, and a locking unit for locking an actual input voltage mode of the welding machine; wherein the control unit controls the input voltage unit to execute a voltage doubling switching action according to the judgment result so as to switch the input voltage signal to a corresponding actual input voltage mode; and the control unit further controls the locking unit to lock the corresponding actual input voltage mode;
and furthermore, the control unit judges whether a preset input voltage mode of the welding machine corresponds to the actual input voltage mode, and controls the power supply output unit to output an output current matched with the preset input voltage mode of the welding machine.

Meanwhile, a double-power-supply switching control method for a welding machine, comprising the steps of:
Step 01, inputting an input voltage signal to a welding machine, performing a continuous detection and modification of the input voltage signal, and outputting a modified input voltage signal;
Step 02, judging whether to perform a voltage doubling according to the modified input voltage signal and obtaining a judgment result;
Step 03, executing a switching action, switching an actual input voltage mode according to the judgment result, and locking the actual input voltage mode of the welding machine, wherein the actual input voltage mode comprises an actual input voltage doubling mode and an actual input voltage non-doubling mode;
Step 04, judging whether a preset input voltage mode of the welding machine corresponds to the actual input voltage mode set in step 03; and if so, executing step 05; and
Step 05, selecting and outputting an output current matched with the preset input voltage mode.

Therefore, the welding machine double-power-supply switching control system for a welding machine and method of the application have the benefits that complicated processes of secondary isolation and voltage reduction during switching of the existing double-power-supply welding machine can be avoided, the cost is reduced, the disadvantage that the input voltage signal can't be judged accurately during use of the existing double-power-supply welding machine is overcome, and the use safety and smooth proceeding of the welding machine are ensured.

DETAILED DESCRIPTION OF THE INVENTION

Figure 1:
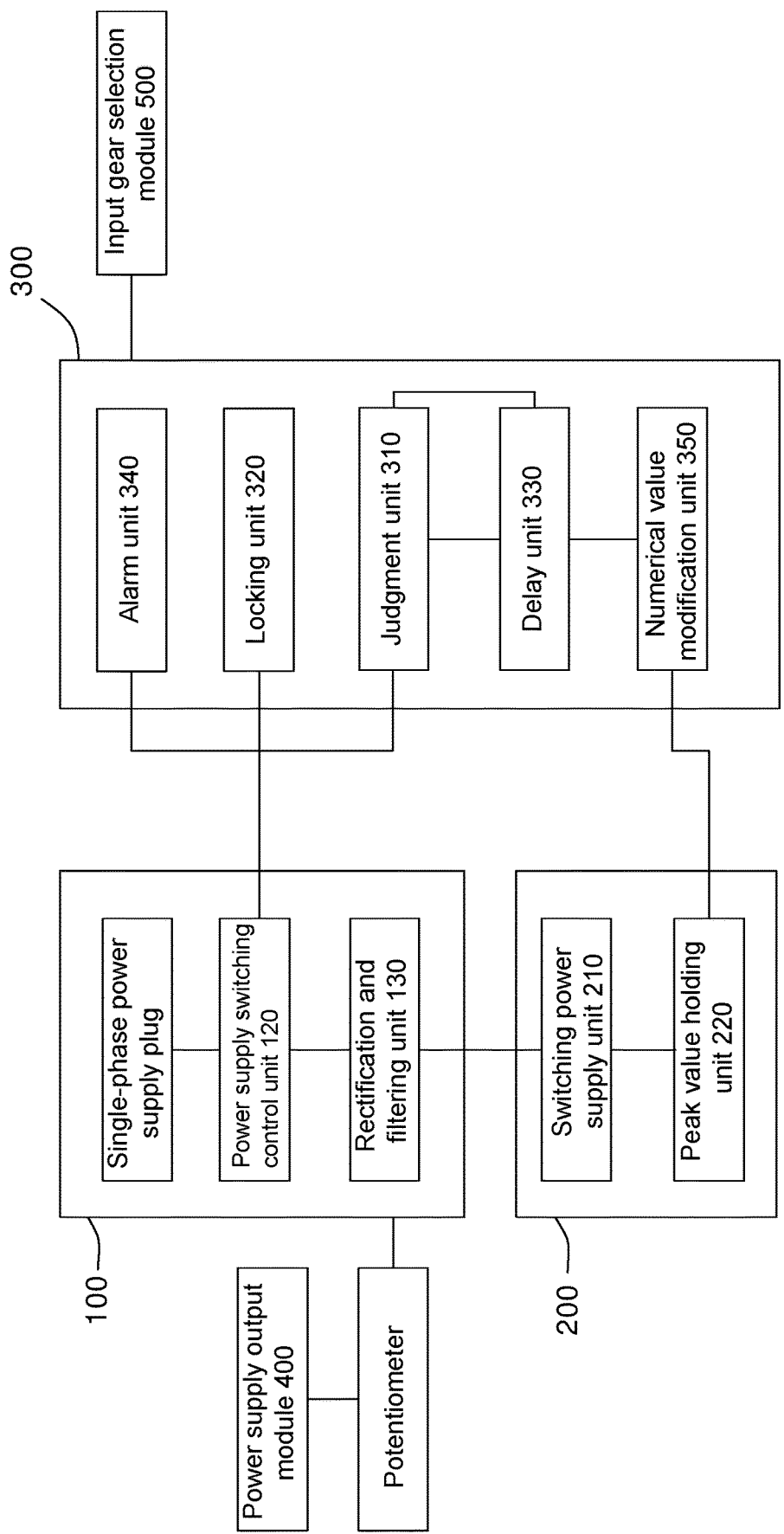
FIG. 1 is a block diagram of a double-power-supply switching control system for a welding machine according to embodiment 1 of the application.

In the interest of clarity, the application will be further described in combination with accompanying drawings. The present application is not limited to the specifically disclosed embodiments undoubtedly, and general alternatives well known to those skilled in the art are also covered by the protection scope of the present application.

A double-power-supply switching control system for a welding machine of the application utilizes an input voltage unit to achieve the input of an input voltage signal, and utilizes a signal modification unit to perform a continuous detection and modification of the input voltage signal for a modified input voltage signal; a power supply output unit is utilized to output a current and a voltage according to a preset input voltage mode; a control unit is utilized to control the various units and components, and is particularly provided with a locking unit and a judgment unit; wherein the judgment unit is utilized to judge whether to perform a voltage doubling; the locking unit is utilized to lock an actual input voltage mode; the control unit controls the input voltage unit to execute a voltage doubling switching action according to the detection of the signal modification unit so as to switch the input voltage signal to a corresponding actual input voltage mode; in addition, the control unit further controls the locking unit to lock the corresponding actual input voltage mode; the control unit is further used for judging whether the preset input voltage mode of the welding machine corresponds to the actual input voltage mode, and transmitting a signal to the power supply output unit; and the power supply output unit outputs an output current according to the preset input voltage mode of the welding machine.

Embodiment 1

The application is further described in detail in combination with FIGS. 1-5 and preferred embodiments. It is important to note that the figures are in a highly simplified form and with imprecise proportions, and are intended only to aid in the illustration of the embodiment conveniently and clearly.

according to the embodiment, an input voltage signal is an AC (Alternating Current) signal as an example for illustration, which is not intended to limit the protection scope of the application.

A double-power-supply switching control system for a welding machine in the embodiment, comprising: an input voltage unit 100, a signal modification unit 200, a control unit 300 and a power supply output unit 400.

Particularly, the input voltage unit 100 is used for inputting an input voltage signal to a welding machine; the signal modification unit 200 performs a continuous detection and modification of the input voltage signal, and outputs a modified input voltage signal to a judgment unit 310; the judgment unit 310 is used for receiving the modified input voltage signal transmitted by the signal modification unit 200, judging whether to perform a voltage doubling and obtain a judgment result; the power supply output unit 400 is used for outputting an output voltage and an output current; the control unit 300 is provided with a locking unit 320 besides the judgment unit 310.

The control unit 300 controls the input voltage unit 100 to execute a voltage doubling switching action according to the judgment result so as to switch the input voltage signal to a corresponding actual input voltage mode; in addition, the control unit 300 further controls the locking unit 320 to lock the corresponding actual input voltage mode; and the control unit 300 further judges whether a preset input voltage mode of the welding machine corresponds to the actual input voltage mode, and controls the power supply output unit 400 to output a matched output current according to the preset input voltage mode of the welding machine.

In the embodiment, an input voltage signal value may be 120 Vac, 240 Vac, 110 Vac or 230 Vac selectively, under various power supplies, particularly an AC power supply.

Here, the detection and modification of the input voltage signal is realized through the signal modification unit 200, and the modified input voltage signal is judged through the judgment unit 310 so as to obtain a result about whether a voltage doubling is required. Here, a preset voltage doubling value range is set, so as to judge whether the modified input voltage signal is in the preset voltage doubling value range and find whether to act on the voltage doubling. Preferably, the preset voltage doubling value range is set at 90-135 Vac. This is because when the input voltage signal value is 230 or 240 Vac, the welding machine works, and when the input voltage signal value falls to a half of 230 or 240 Vac, the welding machine can't work without a voltage doubling. In the embodiment, the control unit 300 is utilized to execute the voltage doubling switching action according to the judgment result, and the input voltage signal is switched to an actual input voltage doubling mode or an actual input voltage non-doubling mode, that is, voltage doubling or voltage non-doubling is performed on the input voltage signal. However, on the condition that the control unit 300 performs the voltage doubling or voltage non-doubling on the input voltage of the welding machine through an internal control, a user will also select the preset input voltage mode, including the preset input voltage doubling mode and the preset input voltage non-doubling mode, as he/she wishes. For example, the actual input voltage mode includes the actual input voltage doubling mode and the actual input voltage non-doubling mode, and the preset input voltage mode includes the preset input voltage doubling mode and the preset input voltage non-doubling mode. When the user selects the preset input voltage doubling mode, if the control unit controls the welding machine to be switched to the actual input voltage doubling mode, the preset input voltage doubling mode is matched with the actual input voltage doubling mode, which means that the output power of the welding machine is matched with a power supply to the welding machine, and thus the welding machine can be used; and if the control unit 300 controls the welding machine to be switched to the actual input voltage non-doubling mode, the preset input voltage doubling mode is not matched with the actual input voltage non-doubling mode, which means that the output power of the welding machine is not matched with the power supply to the welding machine, thus the welding machine can't be used, meanwhile the user can be informed of the mismatching of the power supply to the welding machine by sending an alarm signal and the user can use a matched power supply for replacing the non-matched power supply. Further, after the control unit 300 controls the input voltage unit to switch the input voltage signal to the actual input voltage mode, since the power supply fluctuates in different ranges, to filter the fluctuations and to avoid the situation that actual used output power doesn't meet the requirements due to the fact that the signal modification unit 200 obtains a wrong result which causes the control unit 300 to control the input voltage unit 100 to perform repeated switching on the actual input voltage mode, the control unit 300 is further provided with a locking unit 320, and when the control unit 300 controls the input voltage unit 100 to switch the input voltage signal to the actual input voltage mode according to a detection of the signal modification unit, the control unit 300 further controls the locking unit 320 to lock the actual input voltage mode; for example, when the actual input voltage mode is the actual input voltage doubling mode, the locking unit 320 locks the input voltage signal of the welding machine to be in the actual input voltage doubling mode continuously, so that the welding machine can output a stable power which meets the requirements, without leading to a sharply increased or decreased output power.

In the embodiment, the input voltage unit 100 is further provided with a power supply plug, for example, a single-phase power supply plug 110; then when the welding machine gets the input voltage signal, for example, when the single-phase power supply plug 110 is just plugged into a plug board, a wide range of fluctuations will appear, which will lead to misjudgment of the signal modification unit 200 on detection of the input voltage signal; for example, when the input voltage signal is 110 Vac, the input voltage signal from the power supply generates great fluctuations and thus exceeds the preset voltage doubling value range of 90-135 Vac, so that the judgment unit 310 can't obtain a result of not performing a voltage doubling, and the actual output voltage power can't meet the requirement, leading to that the welding machine can't be used; or a voltage doubling is generated when not required, leading to that the output power is too high and the circuits are burnt out. Therefore, in the embodiment, the control unit 300 is further provided with a delay unit 330, and the delay unit 330 is used for delaying transmission of the modified input voltage signal of the signal modification unit for a delay, and for transmitting the modified input voltage signal to the judgment unit 310 after the delay is over. So, the transmission of the input voltage signal is delayed for a certain time through the delay unit 330, the instant when the welding machine is connected to the power supply, great fluctuations of the input voltage signal are shielded, and thus a relatively stable input voltage signal is obtained, and a detection result of the input voltage signal by the signal modification unit 200 subsequently is more accurate and reliable.

As previously mentioned, when the preset input voltage mode is not matched with the actual input voltage mode, the welding machine will give an alarm signal to inform the user of the mismatching of the power supply. Therefore, in the embodiment, the control unit 300 is further provided with an alarm unit 340. When the control unit 300 judges the preset input voltage mode of the welding machine doesn't correspond to the actual input voltage doubling mode, the control unit 300 transmits a signal to the alarm unit 340, and the alarm unit 340 gives an alarm signal; in addition, the control unit 300 can further repeatedly judge whether the preset input voltage mode of the welding machine corresponds to the actual input voltage mode till judges that the preset input voltage mode of the welding machine is matched with the actual input voltage doubling mode. In the embodiment, the alarm unit 340 can utilize an alarm lamp or a liquid crystal display; the liquid crystal display is LCD1602 or LCD12864; the caution light is in electric connection with other pins of the control unit 300; the control unit 300 can control an on-off state of the caution light to alarm; and if the alarm unit 340 is the liquid crystal display, the control unit 300 displays characters on the liquid crystal display to alarm through a time sequence of the liquid crystal display.

In the embodiment, to achieve the selection of the preset input voltage mode, an input shift-selection unit 500 is further provided in the welding machine; and a selected preset input voltage mode is input to the input shift-selection unit 500 by means of an input shift. The input shift is a rotary knob or a switch disposed on a surface of the welding machine, and the rotary knob or the switch selects from the preset input voltage modes as desired.

Furthermore, to match the preset input voltage mode and the actual input voltage mode and prevent the welding machine from having the problems above, the control unit in the embodiment further can repeat the following processes: the control unit 300 judges whether the preset input voltage mode of the welding machine corresponds to the actual input voltage mode, and if so, the control unit 300 transmits a signal to the power supply output unit 400; and the power supply output unit 400 selects and outputs a matched output current according to the preset input voltage mode. When welding process the welding machine, this operation is repeated, so as to guarantee that the preset input voltage mode of the welding machine should be matched with the actual input voltage mode all the time, for the safety welding process of the welding machine.

In the embodiment, as previously mentioned, a result of performing voltage doubling or a result of not performing the voltage doubling will be obtained from the detection of the input voltage signal. The signal modification unit 200 performs a continuous detection and modification of the input voltage signal; and the judgment unit 310 judges the modified input voltage signal; for example, when the modified input voltage signal is in the preset voltage doubling value range of 90-135 Vac, the judgment unit 310 judges that voltage doubling is required, and outputs a detection result of performing the voltage doubling in real time, by this time, the control unit 300 switches the input voltage signal to the actual input voltage doubling mode for performing the voltage doubling on the input voltage signal, and the control unit 300 controls the locking unit 320 to lock the actual input voltage doubling mode of the welding machine, that is, continuous voltage doubling is performed on the input voltage signal in the welding process, so as to avoid the situation that a welding process can't be performed smoothly due to a misjudgment result of not performing the voltage doubling on the input voltage signal, caused by misjudgment by the signal modification unit 200 because of fluctuations of the power supply in the welding process; then, the control unit 300 judges whether the preset input voltage mode of the welding machine corresponds to the actual input voltage doubling mode; and the control unit 300 judges the preset input voltage mode of the welding machine, if the preset input voltage mode of the welding machine is the preset input voltage doubling mode, then the preset input voltage mode is matched with the actual input voltage doubling mode, which means that the power supply is matched with the output power of the welding machine, therefore, the control unit 300 transmits a signal to the power supply output unit 400, and after receiving the signal, the power supply output unit 400 selects and outputs a matched output current according to the preset input voltage doubling mode of the welding machine.

When the judgment unit 310 obtains a judgment result of not performing the voltage doubling, the control unit 300 switches the input voltage signal to the input voltage non-doubling mode for not performing the voltage doubling on the input voltage signal, and controls the locking unit 320 to lock the actual input voltage non-doubling mode of the welding machine, that is, a continuous voltage non-doubling is performed on the input voltage signal in the welding process, so as to avoid the situations that the welding machine could be burnt out or the welding process can't be performed smoothly due to a misjudgment result of performing the voltage doubling on the input voltage signal, caused by misjudgment by the signal modification unit 200 because of fluctuations of the power supply in the welding process; then, the control unit 300 judges whether the preset input voltage mode of the welding machine corresponds to the actual input voltage non-doubling mode, and if the preset input voltage mode of the welding machine is the preset input voltage non-doubling mode, then the preset input voltage mode is matched with the actual input voltage non-doubling mode, which means that the power supply is matched with the output power of the welding machine, therefore, the control unit 300 transmits a signal to the power supply output unit 400; and the power supply output unit 400 selects and outputs a matched output current according to the preset input voltage non-doubling mode of the welding machine.

It should be stated that the control unit 300 further comprises a numerical modification unit 350 for performing a secondary modification of the modified input voltage signal. This is because the power supply is not stable sometimes, leading to that the input voltage signal is not stable, too. The continuous peak value voltage signal out of the peak value holding unit 220 can remove a flood of fluctuations and tips. To further obtain a more precise input voltage signal value to judge whether to perform the voltage doubling, the numerical modification unit 350 performs a secondary modification of the continuous peak value voltage signal, which specifically comprises the operations of: superimposing a current input voltage signal value to a previous input voltage signal value through the numerical modification unit 350, repeating such operation for a cycle time, and finally calculating a mean value of the input voltage signal values in the cycle time. Particularly, the calculation of the mean value of the input voltage signal values comprises the operations of: firstly, calculating and modifying an $i_{th}$ summation value by utilizing the following formula: $S_i = S_{i-1} + A_i - (S_i - 1/B)$, wherein A is an input voltage signal value, B is a sampling rate constant, $S_i$ is the $i_{th}$ summation value, and $S_{i-1}$ is a $(i-1)_{th}$ summation value; then calculating a mean value of the input voltage signal values according to the formula, $X_p = S_i/B$, by utilizing the $i_{th}$ summation value and the sampling rate constant, to act as a modified input voltage signal, wherein $X_p$ is the mean value of the input voltage signal values, B is a sampling rate constant and Si is an $i_{th}$ summation value.

According to the formula, the input voltage signal value collected every time is iterated in the formula above, when a modified $(i-1)_{th}$ summation value is equal to the product of the sampling rate constant and the $(i-1)_{th}$ input voltage signal value $(S_{i-1} = B*A_{i-1})$, a modified $i_{th}$ summation value Si is equal to $S_{i-1} - A_i - (S_{i-1}/B) = B*A_{i-1} + A_i - A_{i-1}$; when an $i_{th}$ input voltage signal value Ai and a $(i-1)_{th}$ input voltage signal value $A_{i-1}$ which are collected do not have any fluctuations, that is, Si is constant as $B*A_i = B*A_{i-1}$, so, the output $i_{th}$ summation value is a constant, which shows a stable signal input; and when the $i_{th}$ input voltage signal value Ai and the $(i-1)_{th}$ input voltage signal value $A_{i-1}$ which are collected are different, that is, fluctuate, $S_i$ will fluctuate correspondingly, so that the fluctuations of the $i_{th}$ input voltage signal can be monitored from the modified $i_{th}$ summation value.

In addition, the mean value of input signal values can be calculated at any time for actual needs, and the mean value of the input voltage signal values can be calculated according to the formula: $X_p = S_i/B$, by utilizing the $i_{th}$ summation value and the sampling rate constant, and acts as a modified input voltage signal value; wherein $X_p$ is the mean value of the input voltage signal values, B is a sampling rate constant and Si is an $i_{th}$ summation value; Here, the mean value of the input signal values can be calculated after the delay.

It should be stated that the sampling rate constant B relates to an actual sampling rate, for example, a sampling rate of the judgment unit actually utilized.

By performing a secondary modification of the modified input voltage signal through the numerical modification unit 350, signal interference and environmental influence can be further removed, and more precise input voltage signals can be obtained in various environments, so as to get a more accurate judgment result for using the welding machine safely and efficiently.

In the embodiment, the preset input voltage doubling mode or the preset input voltage non-doubling mode of the welding machine corresponds to output current and output voltage which are matched correspondingly. Particularly, the process for the power supply output unit 400 to output the matched output current specifically comprises the operations of: matching to a preset welding machine potentiometer type according to the preset input voltage mode by the control unit 300; transmitting a result to the power supply output unit 400; and selecting a matched output current according to the preset input voltage mode and the preset welding machine potentiometer type by the power supply output unit 400. The welding machine potentiometer types may comprises: potentiometers corresponding to MIG, MMA and TIG, wherein MIG is a metal inert gas welding, MMA is a manual metal arc welding, and TIG is a tungsten inert gas welding. Different welding machine potentiometers correspond to different output current and output voltage. For example, as shown in Table 1, Table 1 lists optional ranges of output current and output voltage corresponding to different welding machine potentiometers in a voltage doubling mode and a voltage non-doubling mode. According to different requirements, appropriate output current and output voltage can be selected within the output current range and the output voltage range in the corresponding output voltage mode and the potentiometer type.

TABLE 1

Output Current and Output Current Corresponding to Different Welding Machine Potentiometers in Different Input Voltage Modes

| | | |
|---|---|---|
| 110 V input voltage signal (voltage doubling mode) | MIG | 30 A/14 V to 100 A/20 V |
| | MMA | 15 A/25 V to 80 A/30 V |
| | TIG | 15 A/10 V to 100 A/20 V |
| 230 V input voltage signal | MIG | 30 A/14 V to 200 A/40 V |

TABLE 1-continued

Output Current and Output Current Corresponding to Different Welding Machine Potentiometers in Different Input Voltage Modes

| (voltage non-doubling mode) | MMA | 15 A/25 V to 160 A/40 V |
|---|---|---|
| | TIG | 15 A/14 V to 200 A/35 V |

Here, it should be stated that in the embodiment, the voltage doubling of the input voltage signal is realized through the input voltage unit 100. The control unit 300 transmits a signal to the input voltage unit 100 according to an obtained voltage doubling result, and the input voltage unit 100 receives the voltage doubling signal, and performs the voltage doubling switching action on the input voltage signal. Particularly, the input voltage unit 100 is provided with a power supply switching control unit 120 and a rectification and filtering unit 130. The power supply switching control unit 120 and the rectification and filtering unit 130 are matched with each other to achieve the voltage doubling of the input voltage signal; here, the power supply switching control unit 120 controls the switching of an input voltage polarity; the rectification and filtering unit 130 is connected with the power supply through the power supply switching control unit 120; and when the power supply switching control unit 120 switches the input voltage polarity, the rectification and filtering unit 130 achieves the voltage doubling of input voltage according to the difference of the input voltage polarity of the power supply switching control unit 120, by utilizing the principle of forward conduction and reverse insulation. A power supply output unit 500 can be connected to the rectification and filtering unit 130 through a potentiometer, and the voltage doubled by the rectification and filtering unit 130 is output through the power supply output unit 500.

In the embodiment, the input voltage unit 100 is further provided with a single-phase power supply plug 110, plugged into the power supply. Here, the input voltage signal of the power supply is an AC signal, therefore, the rectification and filtering unit 130 is utilized for converting the AC signal to a DC signal. In addition, to avoid an influence from a flood of fluctuations and tips of the input voltage signals, the rectification and filtering unit 130 is further internally provided with a supercapacitor, wherein the supercapacitor is utilized to filter a flood of fluctuations and tips, so that a DC signal are obtained with a relatively high precision. The electric capacity of the supercapacitor herein is dozens to hundreds of times of the electric capacity of a conventional capacitor, and is 1-33000 μF.

Figure 2:
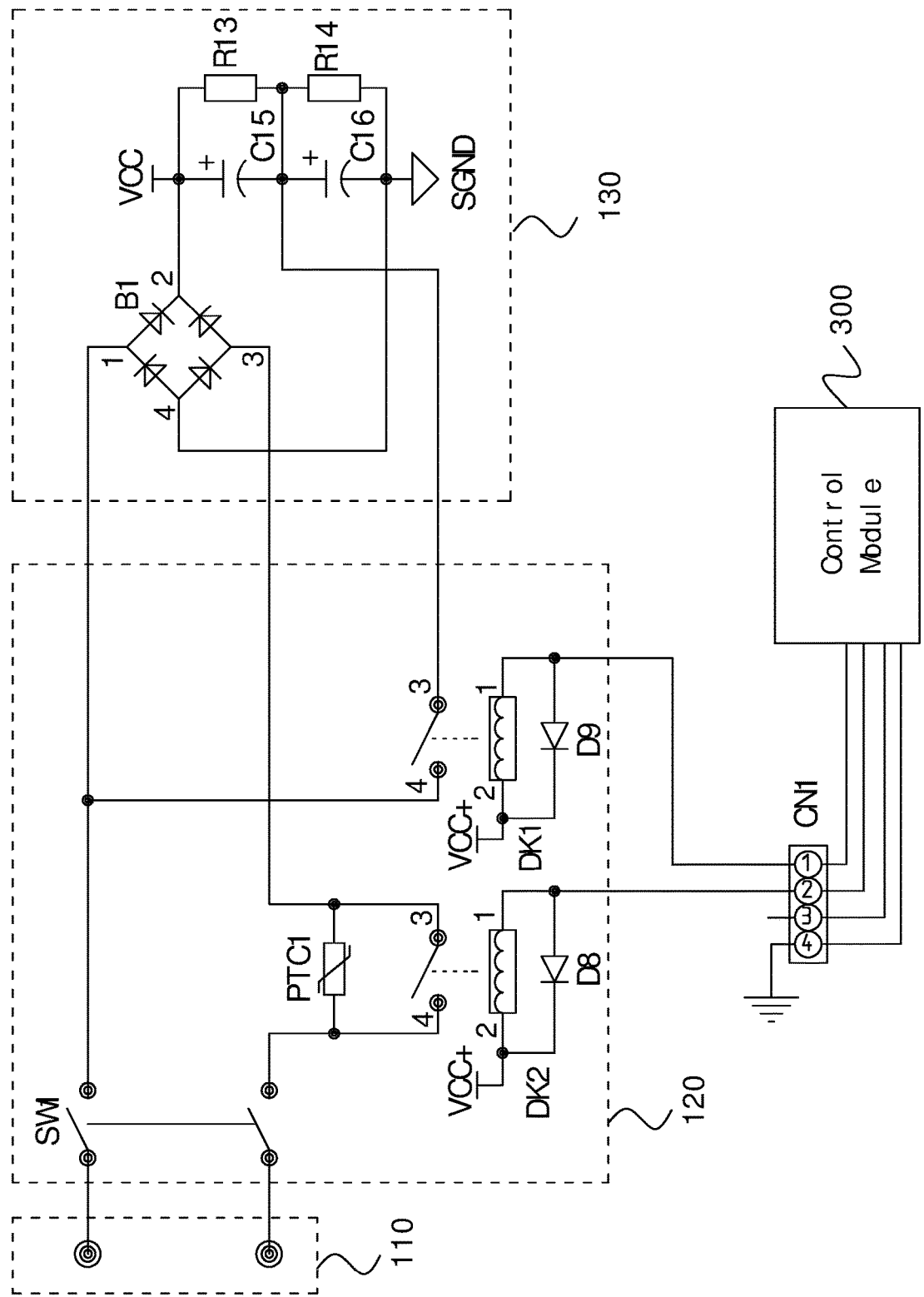
FIG. 2 is a schematic circuit diagram of an input voltage unit of the double-power-supply switching control system for a welding machine according to embodiment 1 of the application.

Respective equivalent circuits of the rectification and filtering unit 130 and the power supply switching control unit 120 and the connection between the two equivalent circuits are as shown in FIG. 2. The single-phase power supply plug 110 is plugged in a single-phase power supply, a switch SW1 is closed, the input voltage unit 100 operates, a thermistor PTC1 charges an electrolytic capacitor C15 and an electrolytic capacitor C16, a switching power supply unit 210 and the control unit 300 are powered on to operate, after the control unit 300 operates, the control pins of the control unit 300 closes a second electromagnetic switch DK, and the second electromagnetic switch DK2 short-circuits the thermistor PTC1, so that the voltage to a positive electrode input terminal VVC is kept stable.

The power supply switching control unit 120 comprises the switch SW1 in electric connection with the single-phase power supply plug 110, and the switch SW1 is connected with the rectification and filtering unit 130 and the thermistor PTC1 sequentially in series. The rectification and filtering unit 130 comprises a rectifier bridge B1, wherein a first pin 1 of the rectifier bridge B1 is a first AC terminal; a third pin 3 is a second AC terminal; a second pin 2 is a positive electrode output terminal; a fourth pin 4 is a negative electrode input terminal; a resistor R13 and a resistor R14 which are connected in series are in electric connection between the positive electrode output terminal and negative electrode input terminal; the electrolytic capacitor C15 and the electrolytic capacitor C16 which are connected in series are further in electric connection between the positive electrode output terminal and negative electrode input terminal; a positive electrode of the electrolytic capacitor C15 is in electric connection with the positive electrode output terminal; a negative electrode of the electrolytic capacitor C15 is in electric connection with a positive electrode of the electrolytic capacitor C16; a negative electrode of the electrolytic capacitor C16 is in electric connection with the negative electrode input terminal; and a connection point between the resistor R13 and the resistor R14 is in short circuit connection with a connection point between the electrolytic capacitor C15 and the electrolytic capacitor C16.

The power supply switching control unit 120 further comprises a first electromagnetic switch DK1 and a second electromagnetic switch DK2 which are the same as the first one. An electromagnetic switch coil DL and a coil switch LK are disposed in the first electromagnetic switch DK1; a first pin 1 and a second pin 2 of the first electromagnetic switch DK1 are respectively two terminals of the electromagnetic switch coil DL; and a third pin and a fourth pin of the first electromagnetic switch DK1 are respectively two terminals of the coil switch LK. When the first electromagnetic switch DK1 is in a non-powered state, the coil switch LK is disconnected.

The third pin 3 of the first electromagnetic switch DK1 is in electric connection with the connection point between the resistor R13 and the resistor R14; the fourth pin 4 of the first electromagnetic switch DK1 is in electric connection with the first pin of the rectifier bridge B1; and a diode D9 is connected between the first pin 1 and the second pin 2 of the first electromagnetic switch DK1 in parallel. A positive electrode of the diode D9 is in electric connection with the first pin 1 of the first electromagnetic switch DK1 and in electric connection with a first power supply signal terminal ①; and a negative electrode of the diode D9 is in electric connection with the second pin 2 of the first electromagnetic switch and in electric connection with a positive electrode of the power supply.

A third pin 3 and a fourth pin 4 of the second electromagnetic switch DK2 are connected to two terminals of the thermistor PTC1, and a diode D8 is connected between a first pin 1 and a second pin 2 of the second electromagnetic switch DK2 in parallel. A positive electrode of the diode D8 is in electric connection with the first pin 1 of the second electromagnetic switch DK2 and in electric connection with a second power supply signal terminal ② and a negative electrode of the diode D8 is in electric connection with the second pin 2 of the second electromagnetic switch DK2 and is in electric connection with a positive power supply electrode VCC+.

When the first electromagnetic switch DK1 is powered on, a voltage difference value between the positive electrode output terminal and the negative electrode input terminal is doubled, that is, a voltage doubling state is entered.

Here, fluctuations and interference exist in the input voltage signal unavoidably, therefore, to eliminate these fluctuations and interference and improve the accuracy of the input voltage signal of the signal modification unit, a switching power supply unit 210 and a peak value holding unit 220 are further disposed in the signal modification unit 200, wherein the switching power supply unit 210 is utilized to eliminate a peak value and interference, and the peak value holding unit 220 is utilized to output a straight and continuous DC input voltage signal, which acts as a modified input voltage signal to improve the judgment accuracy of the judgment unit 310.

Here, since the rectification and filtering unit 130 can convert the AC input voltage signal to the DC input voltage signal, the switching power supply unit 210 can be connected with the power supply output terminal VCC of the rectification and filtering unit 130, and the switching power supply unit 210 receives an input voltage DC signal transmitted the rectification and filtering unit 130; the rectification and filtering unit 130 converts the input voltage signal and outputs as an impulse voltage signal; and the peak value holding unit 220 filters the impulse voltage signal, holds a peak value signal and outputs a continuous peak value voltage signal to the judgment unit 310.

Figure 3:
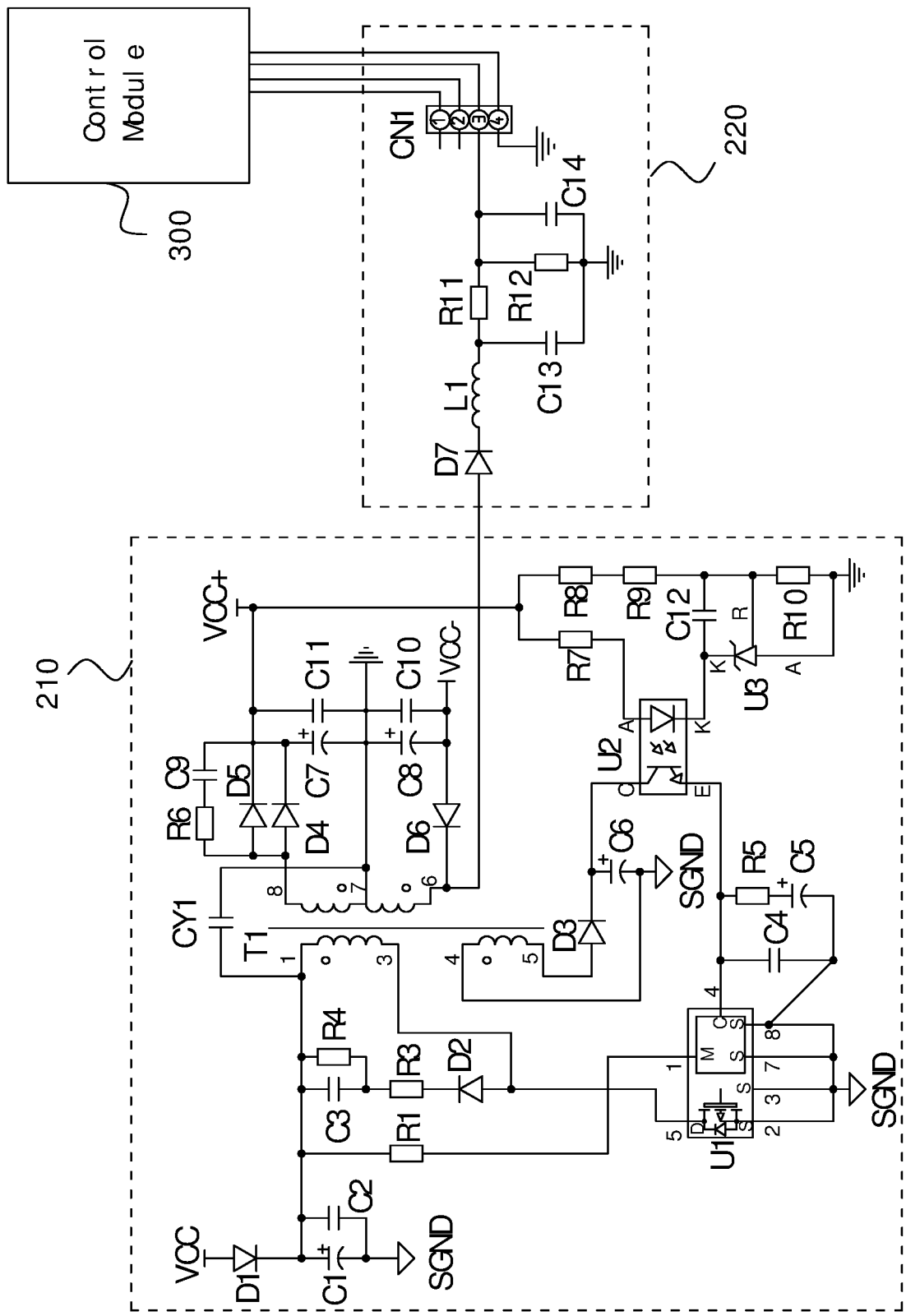
FIG. 3 is a schematic circuit diagram of a signal modification unit of the double-power-supply switching control system for a welding machine according to embodiment 1 of the application.

In the embodiment, it should be stated that the signal modification unit 200 is disposed in the welding machine, is in electric connection with the input voltage unit 100, and is used for detecting the input voltage signal provided by the input voltage unit 100, and further used for eliminating the interference and the tips of the input voltage signal so as to obtain a relatively precise DC input voltage signal. Here, equivalent circuits of the switching power supply unit 210 and the peak value holding unit 220 and the relation between the two equivalent circuits are as shown in FIG. 3. In the FIG. 3, the switching power supply unit 210 comprises a diode D1 and an electrolytic capacitor C1 which are connected in series sequentially; a positive electrode of the diode D1 is in electric connection with the positive electrode output terminal; and a negative electrode of the diode D1 is in electric connection with a positive electrode of the electrolytic capacitor C1. The electrolytic capacitor C1 is connected with a capacitor C2 in parallel. The negative electrode of the diode D1 is in electric connection with a resistor R1, a capacitor C3 and a transformer T1. An terminal, located at an terminal where the negative electrode of the diode D1 is connected, of the resistor R1, is in electric connection with a first pin 1 of a switching power supply chip U1. The switching power supply chip U1 can utilize TOP246GN. A second pin 2, a third pin 3, a seventh pin 7 and an eighth pin 8 of the switching power supply chip U1 are all in electric connection with the negative electrode input terminal. An terminal, not in electric connection with the diode D1, of the capacitor C3 is in electric connection with a resistor R3; an terminal, not in electric connection with the capacitor C3, of the resistor R3 is in electric connection with a fifth pin of the switching power supply chip U1 through a diode D2; a negative electrode of the diode D2 is in electric connection with the resistor R3; and a positive electrode of the diode D2 is in electric connection with the fifth pin of the switching power supply chip U1. The capacitor C3 is connected with a resistor R4 in parallel.

A first pin of the transformer T1 is in electric connection with the negative electrode of the diode D1; a third pin of the transformer T1 is in electric connection with the positive electrode of the diode D2; a fourth pin of the transformer T1 is in electric connection with the negative electrode input terminal; a fifth pin of the transformer T1 is in electric connection with a positive electrode of a diode D3; a negative electrode of the diode D3 is in electric connection with a positive electrode of an electrolytic capacitor C6; a negative electrode of the electrolytic capacitor C6 is in electric connection with the negative electrode input terminal; a sixth pin of the transformer T1 is in electric connection with a negative electrode of a diode D6; and a negative electrode of the diode D6 is a negative power supply electrode. A seventh pin of the transformer T1 is a grounding electrode. An eighth pin of the transformer T1 is in electric connection with a positive electrode of a diode D4 and a positive electrode of a diode D5, and a negative electrode of the diode D4 is in electric connection with a negative electrode of the diode D5 and is a positive power supply electrode. A resistor R6 and a capacitor C9 which are connected in series sequentially are in electric connection between the positive electrode and the negative electrode of the diode D4. The negative electrode of the diode D4 is in electric connection with a positive electrode of an electrolytic capacitor C7, and a negative electrode of the electrolytic capacitor C7 is in electric connection with the grounding electrode. The electrolytic capacitor C7 is connected with a capacitor C11 in parallel. The positive electrode of the diode D6 is in electric connection with a negative electrode of an electrolytic capacitor C8, and a positive electrode of the electrolytic capacitor C8 is in electric connection with the grounding electrode. The electrolytic capacitor C8 is connected with a capacitor C10 in parallel. A capacitor CY1 is in electric connection between the first pin and the seventh pin of the transformer T1.

The positive electrode of the electrolytic capacitor C6 is in electric connection with a photoelectric coupler U2. The photoelectric coupler U2 internally comprises a light-emitting diode and a photosensitive triode; a pin A of the photoelectric coupler U2 is a positive electrode of the light-emitting diode; a pin K is a negative electrode of the light-emitting diode; a pin C is a collector electrode of the photosensitive triode; and a pin E is an emitting electrode of the photosensitive triode. The pin C is in electric connection with the positive electrode of the electrolytic capacitor C6; the pin E is in electric connection with a resistor R5, a capacitor C4, and a fourth pin of the switching power supply chip U1; an terminal, not in electric connection with the pin E, of the resistor R5 is in electric connection with a positive electrode of an electrolytic capacitor C5; and a negative electrode of the electrolytic capacitor C5 is in electric connection with the negative electrode input terminal.

The peak value holding unit 220 comprises a diode D7, an inductor L1 and a resistor R11 which are connected in series sequentially. A positive electrode of the diode D7 is in electric connection with the sixth pin of the transformer T1, and a negative electrode of the diode D7 is connected with the inductor L1. An terminal, not in electric connection with the inductor L1, of the resistor R11 is in electric connection with a third voltage signal terminal. A connection point of the inductor L1 and the resistor R11 is in electric connection with the grounding electrode through a capacitor C13; the third voltage signal terminal is in electric connection with the grounding electrode through a resistor R12; and the third voltage signal terminal is further in electric connection with the grounding electrode through a capacitor C14. The first power supply signal terminal, the second power supply signal terminal, the third voltage signal terminal and a fourth grounding terminal form a terminal row CN1;

wherein a primary winding is disposed between the first pin and the third pin of the transformer T1; a control winding is disposed between the fourth pin and the fifth pin of the transformer T1; a positive power supply winding is disposed between the eighth pin and the seventh pin of the transformer T1; a negative power supply winding is disposed between the sixth pin and the seventh pin of the transformer T1; wherein the first pin, the fourth pin, the sixth pin and the seventh pin of the transformer T1 are dotted terminals mutually.

Through the switching power supply unit 210 and the peak value holding unit 220, the relation of isolating signals and reducing voltage, between the primary winding and a secondary winding of the transformer T1 is utilized. The first pin, the fourth pin, the sixth pin and the seventh pin of the transformer T1 are dotted terminals, without being subject to secondary processing; by utilizing the relation of a primary turn ratio and a secondary turn ratio in the switching power supply unit 210, when the switching power supply unit 210 operates, positive potential breadth voltage of the dotted terminals is in proportional relation, for instance, if the ratio of primary turns to secondary turns of the transformer T1 is 100:10, then positive potential voltage of pulse width dotted terminals at two terminals of the 10 turns of the secondary winding is $\frac{1}{10}$ of positive potential voltage of pulse width dotted terminals at two ends of the primary winding, while the positive potential voltage of the pulse width dotted terminals at the two ends of the primary winding is equal to voltage at two ends of the capacitor C1. By utilizing such relation mechanism, corresponding input voltage value relation can be obtained, so that input voltage signal values are detected. Desired dotted terminal positive potential voltage signals are obtained through rectification by the diode D7, and then through a peak value holding circuit consisting of the inductor L1, the capacitor C13, the capacitor C14, the resistor R11 and the resistor R12, to-be-detected modified input voltage signals are obtained, and fed back to the third voltage signal terminal ③ the third voltage signal terminal ③ is connected with the judgment unit 310, the judgment unit 310 receives the modified input voltage signals transmitted by the third voltage signal terminal ③, and detects and judges whether the input voltage signal values are in the preset voltage doubling value range of 90-135 Vac, if so, the judgment unit 310 transmits a voltage doubling signal to the control unit 300, if not, the judgment unit 310 transmits a voltage non-doubling signal to the control unit 300, and the control unit 300 transmits a voltage doubling instruction or a voltage non-doubling instruction to the input voltage unit 100 according to different signals.

In addition, the control unit 300 in the embodiment comprises the following settings: four pins on the control unit 300 are in signal connection with the terminal row CN1; the four pins on the control unit 300 comprise two control pins, one built-in A/D unit input pin and one grounding pin; wherein the two control pins are in electric connection with the first power supply signal terminal ① and the second power supply signal terminal ② respectively; initial level states of the control pins are high levels; the judgment unit 310 is provided with an A/D unit built in the judgment unit 310; an A/D unit input pin is in electric connection with the third voltage signal terminal ③ the grounding pin is in electric connection with the fourth grounding terminal ③; the built-in A/D unit input pin reads the input voltage signal (voltage analog quantity) on the third voltage signal terminal ③, and converts the input voltage signal to a digital quantity which correspondingly represents a voltage value of the input voltage signal; the judgment unit 310 is further provided with a CPU (Central Processing Unit) built in the control unit 300, the CPU compares the digital quantity and the preset voltage doubling value range, which is 90-135 Vac herein; when comparing the input voltage signal and the preset voltage doubling value range and judging that the input voltage signal falls into the preset voltage doubling value range, the CPU transmits a voltage doubling signal to the control unit 300; the control unit 300 controls the input voltage unit 100 to enter the actual input voltage doubling mode for performing the voltage doubling on the input voltage signal; or, the CPU transmits a voltage non-doubling signal to the control unit 300, and the control unit 300 controls the input voltage unit 100 to enter the actual input voltage non-doubling mode for not performing the voltage doubling on the input voltage signal.

It should be stated that, with reference to FIG. 3 again, the rectification and filtering unit 130 is connected with a common inverter circuit in an inverter welding machining for frequency conversion and outputs a rectifying circuit, at the same time the control unit 300 controls a desired PWM signal of the inverter circuit according to the input voltage signal, and final output current is controlled, so that output power is limited, heating and fire risks of an input cable and machine damage caused by excessive input current are avoided, and a protecting function is played. In addition, a display is disposed on the welding machine, and displays related parameter information when the input voltage signals are different. It should be stated that the invert circuit frequency conversion, rectifying circuit outputting, controlling output current by a PWM (Pulse-Width Modulation) signal output by the control unit 300 of a single chip microcomputer all utilize conventional means disclosed in the prior art, and are thus omitted herein. Terminals of all capacitors, except the electrolytic capacitors, have no difference in the positive electrodes and the negative electrodes herein.

The embodiment further provides a welding machine double-power-supply switching control method, comprising the steps of:

01, inputting an input voltage signal to a welding machine, performing continuous detection and modification on the input voltage signal, and outputting a modified input voltage signal;

and particularly, as previously mentioned, the input voltage signal output by a power supply has a flood of unavoidable fluctuations and tips which increase the interference ability and reduce the accuracy of the input voltage signal, therefore, modification can be performed on the input voltage signal, and this modification process comprises the operation of:

101, converting the input voltage signal and outputting as an impulse voltage signal;

and 102, filtering the impulse voltage signal, holding a peak value signal and outputting a continuous peak value voltage signal;

wherein, as previously mentioned, to avoid signal interference and misjudgment by the judgment unit, after performing continuous detection and modification on the input voltage signal, and before outputting the modified input voltage signal, step 01 further comprises the operation of: delaying outputting of the modified input voltage signal for a delaying time, and then outputting the modified input voltage signal after the delay expires, and then executing step 02;

02, judging whether to perform voltage doubling according to the modified input voltage signal and obtaining a judgment result;

particularly, step 02 comprises the operation of: judging whether the continuous peak value voltage signal is in the preset voltage doubling value range and obtaining a detection result about whether to perform the voltage doubling;

the input voltage signal is highly not stable since the power supply is not stable, and a flood of fluctuations and tips of the continuous peak value voltage signal can be removed through step 02;

and to further obtain a more precise input voltage signal value to judge whether to perform the voltage doubling, between step 01 and step 02, the welding machine double-power-supply switching control method further comprises the step of performing secondary modification on the continuous peak value voltage signal, which specifically comprises steps of:

S1, collecting a first input voltage signal value, and setting a first summation value to be equal to the first input voltage signal value;

and particularly, here, the first input voltage signal value is $A_1$ and the first summation value $S_1$ is equal to $A_1$;

S2, collecting an ith input voltage signal value, wherein i is a positive integer starting from 2;

and S3, superimposing the ith input voltage signal value to an (i−1)th input voltage signal value to obtain an ith summation value; and modifying the ith summation value;

and particularly, step S3 specifically comprises the steps of:

S301, setting a sampling rate constant according to an actual sampling rate, wherein the actual sampling rate is related to a signal collection unit of the welding machine to some extent;

S302, setting a modification value based on the formula that $X=S_{i-1}/B$ according to the sampling rate constant, wherein X is the modification value, is the (i−1)th summation value, and B is the sampling rate constant; here, the sampling rate constant is co-determined by the signal collection unit of the welding machine and the input voltage signal value; and in the embodiment, preferably, the sampling rate constant is 40-60;

and S303, modifying the obtained ith summation value; wherein the (i−1)th summation value subtracts the modification value, namely $S_{i-1}-(S_{i-1}/B)$, and then is added to the ith input voltage signal value, namely $S_{i-1}-(S_{i-1}/B)+A_i$, to obtain a modified ith summation value; here, the modification value X is equal to $S_{i-1}/B$, therefore, the modified ith summation value $S_i$ is equal to $S_{i-1}+A_i(S_{i-1}/B)$;

and here, a second input voltage signal value is added to the first input voltage signal value to obtain a second summation value, when the operation is repeated in the subsequent S4, a third input voltage signal value is added to the second summation value, and so forth;

S4, repeating the S2 to the S3, wherein a value of i is increased by 1 in every cycle;

and S5, monitoring fluctuations of the ith input voltage signal value by utilizing the modified ith summation value in a cycle process, and calculating a modified input voltage signal value;

particularly, when the modified (i−1)th summation value is equal to the product of the sampling rate constant and the (i−1) input voltage signal value, namely $S_{i-1}=B*A_{i-1}$, a modified ith summation value Si is equal to $S_{i-1}-A_i-(S_{i-1}/B)$ equal to $B*A_{i-1}+A_i-A_{i-1}$; when an ith input voltage signal value Ai and a (i−1)th input voltage signal value $A_{i-1}$ which are collected do not have fluctuations, that is, Si is constant as $B*A_i=B*A_{i-1}$, so, the output ith summation value is a constant, which shows stable signal input; when the ith input voltage signal value $A_i$ and the (i−1)th input voltage signal value $A_{i-1}$ which are collected are different, that is fluctuate, $S_i$ will fluctuate correspondingly, so that the fluctuations of the ith input voltage signal can be monitored from the modified ith summation value;

in addition, the mean value of input signal values can be calculated at any time according to actual needs, and the mean value of the input voltage signal values can be calculated according to the formula, $X_p=S_i/B$, by utilizing the ith summation value and the sampling rate constant, and acts as a modified input voltage signal; wherein $X_p$ is the mean value of the input voltage signal values, B is the sampling rate constant and Si is the ith summation value;

it should be stated that the sampling rate constant B is related to an actual sampling rate, for example, a sampling rate of the judgment unit actually utilized;

by performing secondary modification on the modified input voltage signal, signal interference and environmental influence can be further removed, and more precise input voltage signals can be obtained for different environments, so that a judgment result is more accurate, and the use safety of the welding machine and the use efficiency of the welding machine are improved;

in the embodiment, the utilized power supply adopts an AC signal, therefore, before performing continuous detection on the input voltage, step 01 further comprises a process of converting the AC signal of the input voltage into a DC signal; the process of converting the AC signal into the DC signal can be realized by the rectification and filtering unit 130; and to avoid influence from a flood of fluctuations and tips of the input voltage signal, the rectification and filtering unit 130 is internally provided with a supercapacitor, and the supercapacitor is utilized to filter a flood of fluctuations and tips, so that the DC signals with relatively high precision are obtained;

03, executing switching action, switching an actual input voltage mode according to the judgment result, and locking the actual input voltage mode of the welding machine, wherein the actual input voltage mode comprises an actual input voltage doubling mode and an actual input voltage non-doubling mode;

and particularly, the switching of the input voltage signal to the actual input voltage doubling mode is realized by the power supply switching control unit (120) and the rectification and filtering unit (130), and specifically comprises the operation of: switching, by the power supply switching control unit (120), an input power supply polarity input to the rectification and filtering unit (130), and achieving doubling on input voltage according to the input power supply polarity of the power supply switching control unit (120) by the rectification and filtering unit (130);

04, judging whether a preset input voltage mode of the welding machine corresponds to the actual input voltage mode in step 03; and if so, executing step 05;

and particularly, in step 04, the preset input voltage mode of the welding machine is selected to be a preset input voltage doubling mode or a preset input voltage non-doubling mode through input shiftdisposed on the welding machine, for example, the input shiftare buttons capable of being rotated or switches capable of being swung, and the selection on the input shiftis realized by rotating or swinging, so that the preset input voltage mode of the welding machine is selected;

and 05, selecting and outputting matched output current according to the preset input voltage mode;

and particularly, step 05 specifically comprises the operation of:

051, matching to a preset welding machine potentiometer type according to the preset input voltage mode; and 052, selecting matched output current according to the preset input voltage mode and the welding machine potentiometer type;

and the processes of step 051 and step 052 have been described above in detail in the description about the power supply output unit in the double-power-supply switching control system for a welding machine, and are thus omitted herein.

In the embodiment, after step 05, the welding machine double-power-supply switching control method further comprises step 06 of: repeating steps 04-05 till the end. So, in a welding process of the welding machine, the matching of the preset input voltage mode and the actual input voltage mode is judged, and the safety and smooth proceeding of the welding machine in the welding process are guaranteed.

In addition, it should be stated that in step 02, when a current input voltage signal is judged, step 01 is executed at the same time for detecting and modifying a next input voltage signal; and in step 03, when switching action is executed for a current judgment result, step 02 is executed at the same time for judging a next modified input voltage signal. that is, the input voltage signal is subjected to continuous detection and modification without interruption, and the output modified input voltage signal can be interrupted in case of delaying; and these processes of judging the input voltage signal and executing switching action and locking the actual input voltage mode of the welding machine are performed continuously.

Figure 4:
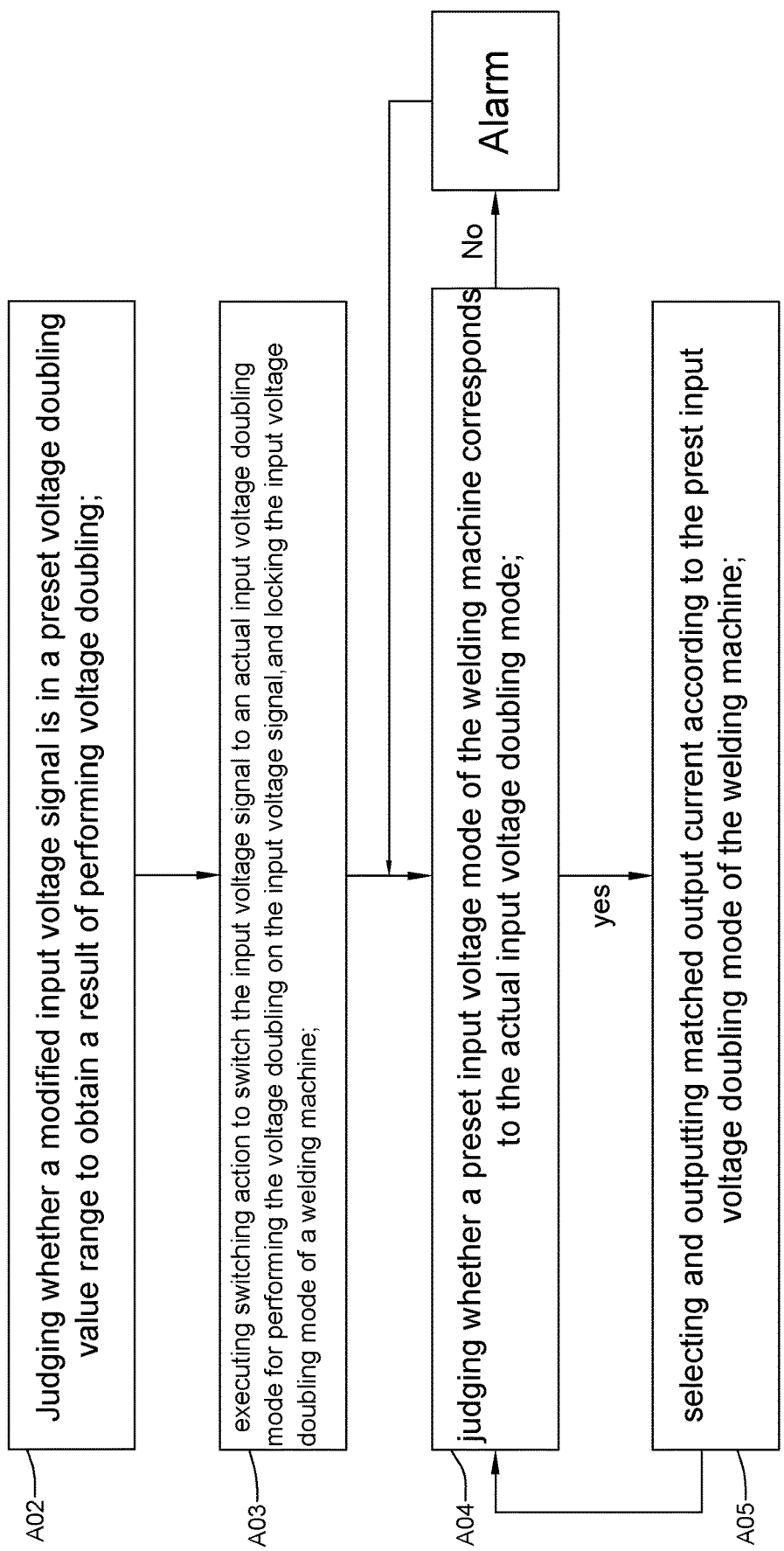
FIG. 4 is a flow chart during voltage doubling of a double-power-supply switching control method of a welding machine according to embodiment 1 of the application.

Please refer to FIG. 4. In the embodiment, on the condition of performing voltage doubling on the input voltage signal, the welding machine double-power-supply switching control method specifically comprises the steps of:

A01, inputting an input voltage signal to a welding machine, performing continuous detection and modification on the input voltage signal, and outputting a modified input voltage signal;

A02, judging whether the modified input voltage signal is in a preset voltage doubling value range to obtain a result of performing voltage doubling;

A03, executing switching action to switch the input voltage signal to an actual input voltage doubling mode for performing the voltage doubling on the input voltage signal, and locking the input voltage doubling mode of the welding machine; and here, the switching of the input voltage signal to the actual input voltage doubling mode is realized by the power supply switching control unit 120 and the rectification and filtering unit 130, and specifically comprises the operation of: switching, by the power supply switching control unit 120, an input power supply polarity input to the rectification and filtering unit 130, and achieving doubling on input voltage according to the input power supply polarity of the power supply switching control unit 120 by the rectification and filtering unit 130;

A04, judging whether a preset input voltage mode of the welding machine corresponds to the actual input voltage mode in step A03, and executing step 05 if the preset input voltage mode of the welding machine is the preset input voltage doubling mode;

and A05, selecting and outputting matched output current according to the preset input voltage doubling mode of the welding machine.

In the embodiment, after step 05, the welding machine double-power-supply switching control method further comprises step A06 of: repeating steps A04-A05 till the end. So, in a welding process of the welding machine, the matching of the preset input voltage mode and the actual input voltage mode is judged, and the safety and smooth proceeding of the welding machine in the welding process are guaranteed.

It should be stated that other specific processes about steps A01-A05 are described with reference to the description in steps 01-05 above, and are thus omitted herein.

Figure 5:
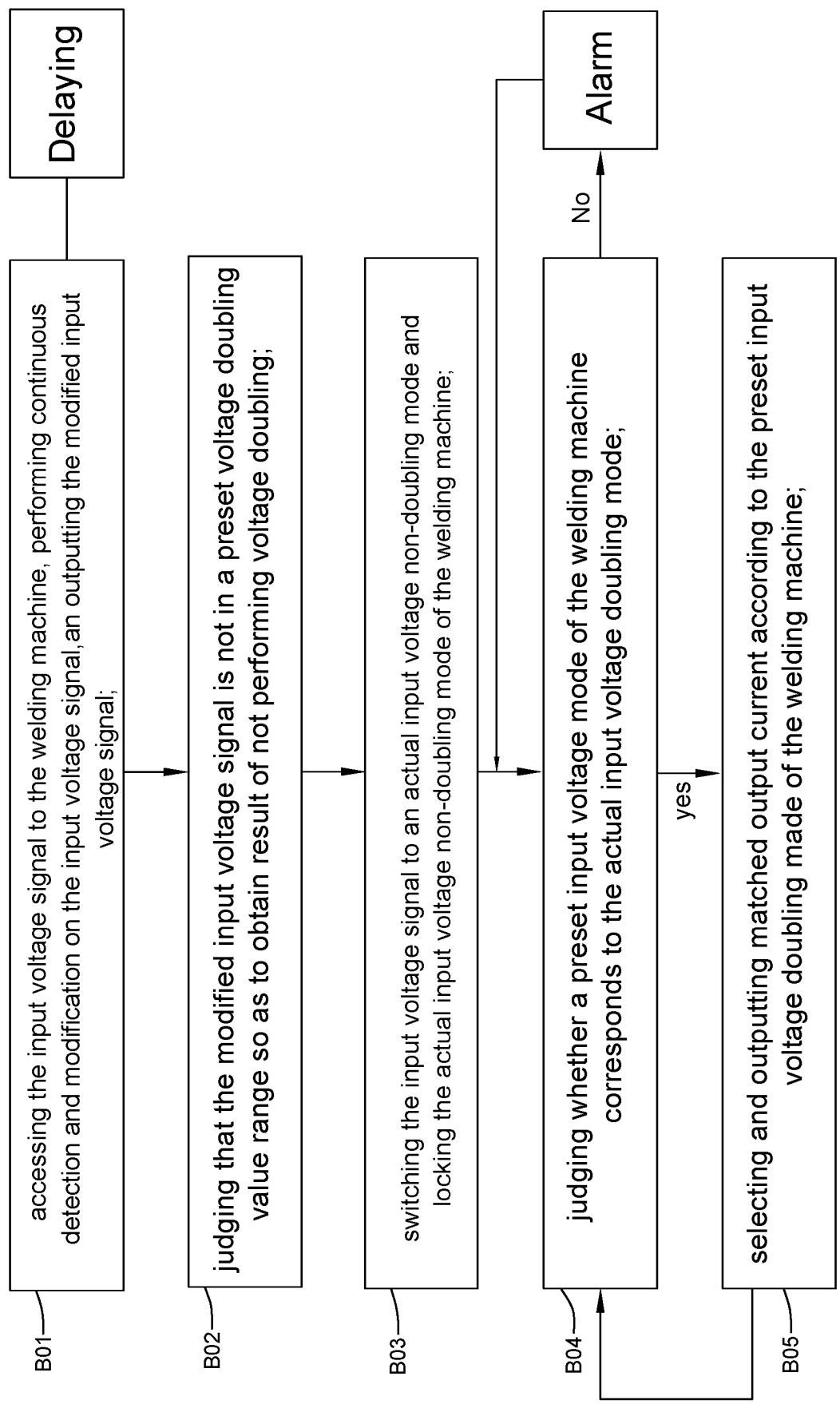
FIG. 5 is a flow chart during voltage non-doubling of the welding machine double-power-supply switching control method according to embodiment 1 of the application.

Please refer to FIG. 5. In the embodiment, on the condition of not performing voltage doubling on the input voltage signals, the welding machine double-power-supply switching control method specifically comprises the steps of:

B01, inputting an input voltage signal to a welding machine, performing continuous detection and modification on the input voltage signal, and outputting a modified input voltage signal;

B02, judging whether the modified input voltage signal is in a preset voltage doubling value range to obtain a result of not performing voltage doubling;

B03, switching the input voltage signal to the actual input voltage non-doubling mode and locking the actual input voltage non-doubling mode of the welding machine;

B04, judging whether the preset input voltage mode of the welding machine corresponds to the actual input voltage non-doubling mode; and executing step B05 if the preset input voltage mode of the welding machine is the preset input voltage non-doubling mode;

and B05, selecting and outputting matched output current according to the preset input voltage doubling mode of the welding machine.

In the embodiment, after step B05, the welding machine double-power-supply switching control method further comprises step B06 of: repeating steps B04-B05 till the end. So, in a welding process of the welding machine, the matching of the preset input voltage mode and the actual input voltage mode is judged, and the safety and smooth proceeding of the welding machine in the welding process are guaranteed.

It should be stated that other specific processes about steps B01-B05 are described with reference to the description in steps 01-05 above, and are thus omitted herein.

With regard to step 04, step A04 or step B04, the welding machine double-power-supply switching control method performing voltage doubling and the welding machine double-power-supply switching control method not performing the voltage doubling both further comprise the steps of giving an alarm signal when judging the preset input voltage mode of the welding machine doesn't correspond to the actual input voltage mode, and repeating step 04.

Embodiment 2

Embodiment 2 of the application differs from Embodiment 1 in that the input voltage signal input to the input voltage unit in Embodiment 1 is an AC signal, certainly without precluding the situation that the input voltage signal input to the input voltage unit is a DC signal, while in Embodiment 2, an input voltage signal in the input voltage unit is a DC signal.

On such basis, Embodiment 2 differs from Embodiment 1 in that when the input voltage signal is the DC signal, a conversion switch can be disposed between the power supply switching control unit and the power supply for voltage doubling on the DC input voltage signal in the input voltage unit 100, positive and negative switching on the input voltage signal is realized through the turning-on and turning-off of the conversion switch, or a DC-to-AC unit is utilized, and such DC-to-AC unit can adopt a conventional DC-to-AC mode, such as an inverter, which is omitted herein.

Although the application has been disclosed above by reference to preferred embodiments, the embodiments are for illustration purposes and are not intended to limit the scope of this application, those skilled in the art will understand that various modifications and changes may be made thereto without departing from the spirit and scope of the application, and the claims prevail the scope of protection as claimed herein.

The invention claimed is:

1. A double-power-supply switching control system for a welding machine, comprising:
an input voltage unit for inputting an input voltage signal to a welding machine, wherein the input voltage unit comprises a power supply switching control unit and a rectification and filtering unit; wherein the power supply switching control unit is configured for switching the input voltage polarity; and the rectification and filtering unit is configured for doubling the input voltage according to the input voltage polarity of the power supply switching control unit;
a signal modification unit, for performing a continuous detection and modification of the input voltage signal, and outputting a modified input voltage signal, wherein the signal modification unit comprises a switching power supply unit and a peak value holding unit; the rectification and filtering unit converts the input voltage signal to an impulse voltage signal; and the peak value holding unit filters the impulse voltage signal, holds a peak value signal and outputs a continuous peak value voltage signal;
a numerical modification unit, for performing a secondary modification on the continuous peak value voltage signal, wherein the numerical modification unit is configured for superimposing a current input voltage signal value to a previous input voltage signal value, repeating the superimposing for a cycle time, and calculating a mean value of the input voltage signal values in the cycle time;
a power supply output unit for outputting an output voltage and an output current;
a control unit provided with a judgment unit for receiving said modified input voltage signal and judging whether to perform a voltage doubling and obtaining a judgment result, and a locking unit for locking an actual input voltage mode of the welding machine; wherein the control unit controls the input voltage unit to execute a voltage doubling switching action according to the judgment result so as to switch the input voltage signal to a corresponding actual input voltage mode; and the control unit further controls the locking unit to lock the corresponding actual input voltage mode; and furthermore, the control unit judges whether a preset input voltage mode of the welding machine corresponds to the actual input voltage mode, and controls the power supply output unit to output an output current matched with the preset input voltage mode of the welding machine.

2. The double-power-supply switching control system for a welding machine according to claim 1, characterized in that the control unit further comprises a delay unit; and the delay unit is configured for delaying a transmission of the modified input voltage signal of the signal modification unit, and transmitting the modified input voltage signal to the judgment unit after the delay expires.

3. The double-power-supply switching control system for a welding machine according to claim 1, characterized in that when the judgment unit outputs a judgment result of performing the voltage doubling, the control unit switches the input voltage signal to an actual input voltage doubling mode for performing the voltage doubling of the input voltage signal, and controls the locking unit to lock the actual input voltage doubling mode of the welding machine; then, the control unit judges whether the preset input voltage mode of the welding machine corresponds to the actual input voltage doubling mode; and if so, the control unit transmits a signal to the power supply output unit, and the power supply output unit selects and outputs an output current matched with the preset input voltage doubling mode of the welding machine.

4. The double-power-supply switching control system for a welding machine according to claim 1, characterized in that when the judgment unit outputs a judgment result of performing the voltage non-doubling, the control unit switches the input voltage signal to an input voltage non-doubling mode for not performing the voltage doubling of the input voltage signal, and controls the locking unit to lock an actual input voltage non-doubling mode of the welding machine; then, the control unit judges whether the preset input voltage mode of the welding machine corresponds to the actual input voltage non-doubling mode; and if so, the control unit transmits a signal to the power supply output unit, and the power supply output unit selects and outputs an output current matched with the preset input voltage non-doubling mode of the welding machine.

5. The double-power-supply switching control system for a welding machine according to claim 1, characterized in that the control unit further comprises an alarm unit; and when the control unit judges that the preset input voltage mode of the welding machine doesn't correspond to the actual input voltage doubling mode, the control unit transmits a signal to the alarm unit, the alarm unit gives an alarm signal, and the control unit repeatedly judges whether the preset input voltage mode of the welding machine corresponds to the actual input voltage mode.

6. The double-power-supply switching control system for a welding machine according to claim 1, characterized in that the process for the power supply output unit to output the matched output current comprises the steps of: the control unit matches to a preset welding machine potentiometer type according to the preset input voltage mode, and then transmits a result of the matching to the power supply output unit; and the power supply output selects a output current matched with the preset input voltage mode and the preset welding machine potentiometer type unit.

7. The double-power-supply switching control system for a welding machine according to claim 1, characterized in that the control unit further repeats the following processes: the control unit judges whether the preset input voltage mode of the welding machine corresponds to the actual input voltage mode, and if so, the control unit transmits a signal to the power supply output unit; and the power supply output unit selects and outputs an output current matched with the preset input voltage mode.

8. The double-power-supply switching control system for a welding machine according to claim 1, characterized by further comprising an input shift-selection unit; the welding machine is provided with several input shift positions connected with the input shift-selection unit; and a selected preset input voltage mode is input to the input shift-selection unit by selecting one of the input shifts.

9. A double-power-supply switching control method for a welding machine, comprising the steps of:
Step 01, inputting an input voltage signal to a welding machine, performing a continuous detection and modification of the input voltage signal, and outputting a modified input voltage signal;

performing a secondary modification on the continuous peak value voltage signal, wherein the performing a secondary modification on the continuous peak value voltage signal comprises: superimposing a current input voltage signal value to a previous input voltage signal value, repeating the superimposing for a cycle time, and calculating a mean value of the input voltage signal values in the cycle time;

Step 02, judging whether to perform a voltage doubling according to the modified input voltage signal and obtaining a judgment result;

Step 03, executing a switching action, switching an actual input voltage mode according to the judgment result, and locking the actual input voltage mode of the welding machine, wherein the actual input voltage mode comprises an actual input voltage doubling mode and an actual input voltage non-doubling mode;

Step 04, judging whether a preset input voltage mode of the welding machine corresponds to the actual input voltage mode set in step 03; and if so, executing step 05; and Step 05, selecting and outputting an output current matched with the preset input voltage mode, wherein the step 01 specifically comprises:

Sub-step 101, converting the input voltage signal to an impulse voltage signal; and Sub-step 102, filtering the impulse voltage signal, holding a peak value signal and outputting a continuous peak value voltage signal;

and the step 02 specifically comprises: judging whether the continuous peak value voltage signal is in the preset voltage doubling value range and obtaining a detection result whether to perform the voltage doubling.

10. The welding machine double-power-supply switching control method according to claim 9, characterized in that in step 02, when the modified input voltage signal is judged to be in a preset voltage doubling value range, performing a voltage doubling;

step 03 specifically comprises: switching the input voltage signal to the actual input voltage doubling mode, performing the voltage doubling of the input voltage signal, and locking the input voltage doubling mode of the welding machine;

step 04 specifically comprises: judging whether the preset input voltage mode of the welding machine corresponds to the actual input voltage doubling mode in step 03; and executing step 05 if the preset input voltage mode of the welding machine is the preset input voltage doubling mode;

and step 05 specifically comprises: selecting and outputting the output current matched with the preset input voltage doubling mode of the welding machine.

11. The double-power-supply switching control method according to claim 10, characterized in that in step 03, the switching the input voltage signal to the actual input voltage doubling mode is realized by the power supply switching control unit and the rectification and filtering unit, and specifically comprises: the power supply switching control unit switch the polarity of the input power supply input to the rectification and filtering unit, and the rectification and filtering unit doubles the input voltage according to the polarity of the input power supply of the power supply switching control unit.

12. The double-power-supply switching control method according to claim 9, characterized in that in step 02, when judging that the modified input voltage signal is not in the preset voltage doubling value range, not performing the voltage doubling;

step 03 specifically comprises: switching the input voltage signal to the actual input voltage non-doubling mode and locking the actual input voltage non-doubling mode of the welding machine;

step 04 specifically comprises: judging whether the preset input voltage mode of the welding machine corresponds to the actual input voltage non-doubling mode, and executing step 05 if the preset input voltage mode of the welding machine is the preset input voltage non-doubling mode;

and step 05 specifically comprises: selecting and outputting an output current matched with the preset input voltage non-doubling mode of the welding machine.

13. The double-power-supply switching control method according to claim 9, characterized in that step 04 further comprises: giving an alarm signal if the preset input voltage mode of the welding machine doesn't correspond to the actual input voltage mode, and executing this step 04 repeatedly.

14. The double-power-supply switching control method according to claim 9, characterized in that step 01 further comprises: after performing continuous detection and modification on the input voltage signal, and before outputting the modified input voltage signal, delaying outputting of the modified input voltage signal for a delaying time, and then outputting the modified input voltage signal after the delay expires.

15. The double-power-supply switching control method according to claim 9, characterized in that step 05 specifically comprises:

Sub-Step 051, matching a preset input voltage mode to a preset welding machine potentiometer type; and Sub-Step 052, selecting an output current matched to the preset input voltage mode and the welding machine potentiometer type.

16. The double-power-supply switching control method according to claim 9, characterized in that in step 04, the preset input voltage mode of the welding machine is selected to be the preset input voltage doubling mode or the preset input voltage non-doubling mode through the input shift disposed in the welding machine.

17. The double-power-supply switching control method according to claim 9, characterized in that in step 02, when the current input voltage signal is judged, step 01 is executed at the same time for detecting and modifying the next input voltage signal; and in step 03, when a switching action is executed at a current judgment result, step 02 is executed at the same time for judging the next modified input voltage signal.

* * * * *